No. 781,711. PATENTED FEB. 7, 1905.
A. H. BROWN.
PROCESS OF TREATING PRECIOUS METAL BEARING ORES.
APPLICATION FILED AUG. 12, 1904.
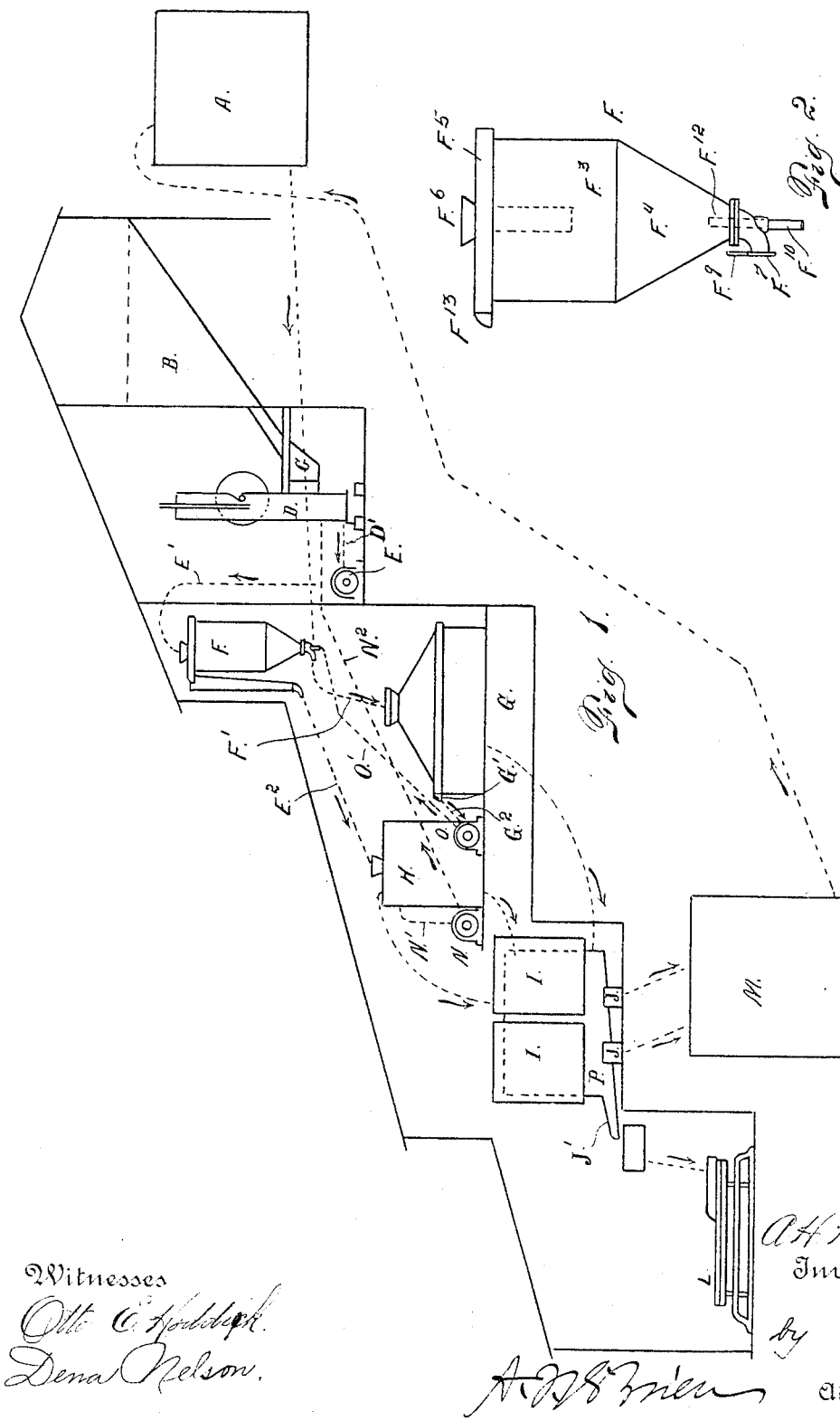

No. 781,711.                                                          Patented February 7, 1905.

UNITED STATES PATENT OFFICE.

ALDEN H. BROWN, OF BOULDER, COLORADO.

PROCESS OF TREATING PRECIOUS-METAL-BEARING ORES.

SPECIFICATION forming part of Letters Patent No. 781,711, dated February 7, 1905.

Application filed August 12, 1904. Serial No. 220,516.

*To all whom it may concern:*

Be it known that I, ALDEN H. BROWN, a citizen of the United States, residing at Boulder, in the county of Boulder and State of Colorado, have invented certain new and useful Improvements in Processes for the Treatment of Precious-Metal-Bearing Ores; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a process for the treatment of precious-metal-bearing ores, and embraces the treatment of the ore by a solution of cyanid of potassium or of other alkaline cyanid and the subsequent treatment of the ore by concentration.

It has been the practice for many years in plants where the concentration and cyanid processes are used in combination to treat the ore, first, by concentration, and, secondly, by cyanid. The process which I have invented and which I now have in successful operation is a reversal of this proceeding with the addition of certain special features in connection with the cyanid step. The advantage in treating many ores by my present system is due to the fact that in case of most gold and silver bearing ores the use of water in crushing by stamps or rolls or in connection with the concentrating process occasions much loss of values by what is technically known as "sliming," resulting from the fact that a large percentage of the values in the ore treated is reduced to so fine a state of division that it is taken up in suspension by the water used, making it difficult, if not impossible, to settle these values for further treatment within the limits of a plant of ordinary construction for the reason that in the case of many ores these slime values remain in suspension for many hours. It will therefore be understood that in the case of ores of this sort, if amalgamation, concentration, or other process involving the use of water for crushing or treatment is used preliminary to the cyanid process, it will be necessary to have a very extensive system of settling-tanks in order to recover these suspended values and hold them in the mill, so that they may be subjected to further treatment. It is a well-known fact that the cyanid process recovers only the fine values, and in the treatment that I have devised these fine values are recovered by the cyanid process in the beginning, leaving only the coarser values, which are readily recoverable by concentration, the latter being specially adapted for saving this class of values.

So far as I am able to learn this system of treatment is entirely new and original with me, and in order that it may be readily understood I will give a brief description of the actual operation of the process. In this connection I will refer to the drawings hereto attached and made a part of this specification and which give in outline the position of the more important pieces of apparatus used in a mill of this description. In order to avoid confusion, I have omitted many of the minor details and have only shown the essential features. In the drawings gravity-stamps are supposed to be employed for pulverizing purposes. I will say, however, that this is merely a matter of detail, since any suitable pulverizing device may be employed. The drawings illustrate a wet-crushing plant. I will say, however, that so far as the broad idea of employing the cyanid step previous to concentration is concerned the advantage in this respect would be equally great if dry crushing instead of wet crushing were employed.

In the drawings I have omitted altogether the coarse-crushing department, which in the case of the mill I have in mind is in a separate building, the crushed ore being conveyed into the ore-bin above the stamps by means of a belt conveyer. (Not shown.)

In the drawings, Figure 1 is a side elevation illustrating conventionally and in outline only the principal features of a mill adapted to carry out or practice my improved process. Fig. 2 is a detail view of a portion of the apparatus shown on a larger scale and somewhat more in detail than in the general view.

The same reference characters indicate the same parts in both views.

The operation of this mill is as follows: The crushed ore in the ore-bin B is delivered to the stamp-battery D by the automatic feeder C. In the stamp-battery the ore is pulverized to suitable mesh, as in ordinary stamp-mill practice, with the exception that instead of battery-water cyanid solution of a suitable strength from the solution-tank A is used in the stamp-mill. The pulverized ore and cyanid solution in contact with it pass from the stamp-mill to a sand-pump E, the connection between the stamp-mill and the sand-pump being indicated by a dotted line D'. The ore in solution is elevated by this pump to the classifier F, the elevator leading from the pump to the classifier being also indicated by a dotted line E'. This classifier separates the slimes or amorphous portion of the pulp from the granular material in order to facilitate the leaching of this latter product, the sand or coarser portion of the product after classification going to the leaching-tank G by way of a conduit indicated by the dotted line F'. The ore in the leaching-tank may be treated by filtration, as in ordinary cyanid practice. The slimes are sent from the classifier to the slime-tank H by way of a conduit indicated by the dotted line E². In the tank H these slimes are treated by agitation, settling, and decantation in order to remove the gold-bearing solution, this part of the treatment being carried out in accordance with the standard practice. Most of the cyanid solution used in the stamp-battery goes from the classifier with the slimes to the slime-tank, where after settling the greater portion of it is pumped back to the stamp-battery and used over again, the suction-pump N being connected with the slime-tank by a conduit N' for this purpose. The conduit through which the solution passes from the tank N to the battery is designated by the dotted line N². Before filling the leaching-tank the latter is filled with cyanid solution. It is equipped with an overflow-launder, (indicated on the drawings by the reference character G',) through which the solution when displaced by the sand overflows to a centrifugal pump O, the connection between the launder G' and the pump being indicated by the dotted line G². The pump O elevates this overflow solution to the classifier, where it is used to furnish the ascending current, the conduit through which the solution passes from the pump O to the classifier being indicated by the dotted line O'. The object of this construction and arrangement is to secure the effect of hydraulic classification without introducing an inconvenient amount of solution in circulation, the effect of the device being to circulate the same volume of solution over and over again through the classifier. Hydraulic classification using an ascending current of water would be impracticable in this process on account of the extensive dilution of the cyanid solution that would result. The object in having the sand-tank G filled with solution while being filled with sand is to furnish a means of keeping the slimes, a small amount of which always come down with the sand, in suspension, so that they will not form impervious layers and interfere with the subsequent leaching process. When the leaching-tank G is nearly filled with sand, this superincumbent layer of suspended slimes overflows into the overflow-launder and passes to the centrifugal pump O. When this stage of the process is reached, in order to avoid introducing these slimes into the classifier by means of suitable valves (not shown) the discharge from the pump O may change to the slime-tank, and during the balance of the run fresh solution from the solution-tank A may be used to furnish the ascending current in the classifier.

The special features of my improvement so far as the cyaniding process is concerned consist in cutting down the volume of solution used by settling and pumping back the solution to the stamp-battery and the use of cyanid solution to create the ascending current in the classifier. In order to complete the description of the process, however, I will say that the gold-bearing solutions that are decanted from the slime-tank H and filtered from the leaching-tank G are conveyed by means of suitable pipes and fittings to the tanks I I. From the tanks I I the gold-bearing solutions pass to the zinc boxes J J, where the slimes are precipitated. From these zinc boxes the solutions pass by means of suitable pipes to the sump-tank M, from which they are pumped back by means of a suitable pump to the solution-tank A. As many tanks may be used for the various purposes indicated as may be necessary in order to give the plant sufficient capacity. It is usual, however, to have both sump and solution tanks in duplicate, the number and size of the leaching and slime tanks being determined by the capacity of the plant. After the cyanid treatment has been completed the sand-tailings from the leaching-tank G are transferred by means of suitable conveyers to the tailings-bin P, which is shown in outline behind the tanks I I. From this tailings-bin these tailings are sluiced into the mixer K through a trough J'. The mixer distributes the tailings to the concentrating-table L. As many tables as necessary may be used. It will be observed that only one instrumentality of the different kinds is illustrated in the drawings, since this is sufficient to make my improved process thoroughly comprehensible. The slime-tailings in the slime-tank H after the decantation process has been completed are discharged by means of suitable pipes directly to the mixer.

In regard to the matter of concentration I will say that any desired system may be used, either the standard practice, in which differences in specific gravity are taken advantage of in order to effect the separation of the metallic values from the gangue, or any of the more recent oil-concentrating processes, in which the affinity of certain oils for metallic sulfids and other valuable minerals is made use of in order to effect the proper separation.

In Fig. 2 a sketch of a wet classifier is shown in detail and on a larger scale than in the general views. In regard to this classifier I will say that it does not embody any new feature so far as its construction is concerned, but makes use of principles that are embodied to greater or less extent in many different types of hydraulic classifier. It consists of a cylindrical portion $F^3$ in connection with a conical portion $F^4$, made of suitable sheet metal. Around the top of the cylindrical portion of the classifier is fastened an overflow-trough $F^5$, and in the center of the top of this cylindrical portion of the classifier is the downtake-funnel $F^6$. $F^7$ is an angle-valve or hutch-gate, which is attached to the bottom of the conical portion of the classifier and opens into it. $F^9$ is the movable part of the hutch-gate. $F^{10}$ is a pipe of suitable diameter tapped into the angle of the hutch-gate and passes up through it into the body of the classifier, terminating at $F^{12}$. The operation of this classifier is as follows: The pulp to be classified is introduced into the downtake-funnel $F^6$, the classifier having been first filled with cyanid solution. As soon as the pulp begins to enter the classifier at $F^6$ a current of cyanid solution is turned into the classifier at the bottom through the pipe H, and the gate $F^7$ is opened to a suitable extent. The ascending current of solution produces an overflow into the overflow-launder $F^5$, which carries with it the slimes or amorphous portion of the pulp which overflows at the lip $F^{13}$. The sands or coarser granular portion of the pulp descending through this ascending current pass out through the opening of the hutch-gate at $F^7$. By varying the degree of the opening at $F^7$ and the amount of solution introduced to the pipe H the operation of the classifier may be so controlled as to carry as much or as little of the pulp into the overflow as may be necessary in order to effect proper classification of the material handled. It is the usual and standard practice to use an ascending current of water in all classifiers that operate on this principle. The new feature that I have devised in this connection consists simply of the use of an ascending current of cyanid solution for the reasons heretofore stated.

Attention is called to the fact that an amalgamating step may be introduced at any suitable stage of the progress of my improved process wherever the ore is of such a nature as to make this desirable or advantageous. This may be done either before or after concentration. However, if the ore is pulverized in the presence of cyanid solution, it will not do to attempt to amalgamate the free mineral, since the cyanid solution will not harmonize with the quicksilver or mercury necessary to amalgamation. However, if the ore is not subjected to cyanid solution before the leaching commences the amalgamating step may be introduced at any desired stage of the process before the leaching begins.

An important feature of my improved process consists in the fact that it is adapted for the treatment of raw or unroasted sulfid ore. Experience has proven and it is well understood that the roasting of ores is a very expensive proceeding. An important object of this invention is to recover the values without the necessity of roasting. In case of many ores the cyanid process will not of itself make a satisfactory recovery of the values unless the ore be roasted before being treated by the cyanid process; nor can such ores be concentrated either in the raw or roasted condition and a satisfactory recovery of the values obtained. In other words, in such cases the raw ore will not yield a satisfactory percentage of its values if treated by either the cyanid or concentration process alone; but by using these processes in the order set forth in this specification it is practicable to recover a high percentage of the values without the use of roasting and without the use of oxidizing agents or other chemical substances for the purpose of increasing the activity of the cyanid solution.

The term "concentration" is used in this specification in its technical or metallurgical sense and must be distinguished from "amalgamation," in which mercury is always employed. In the "concentration" of ores, as the term must be understood in this specification, no mercury whatever is employed, the separation of the values from the gangue being usually effected by virtue of the difference in specific gravity existing between the values and the gangue. Where oil is employed for the saving of the values, the latter are made to float on top of the water with the oil. While the principle employed in the oil process is somewhat different from the principle of specific gravity, even the oil process of concentration may be clearly distinguished from amalgamation, since in the latter mercury is invariably employed, and no process is termed an "amalgamating process" unless mercury in some form is employed.

Having thus described my invention, what I claim is—

1. The herein-described process for the treatment of ore consisting in first pulverizing the ore in the presence of cyanid solution; second, subjecting the ore to hydraulic classification by the introduction of cyanid solution at the bottom of an overflow-tank to produce an ascending current; third, leaching the ore by the use of cyanid solution whereby the finer values of the ore are dissolved; fourth, removing the dissolved metallic values from the ore in any suitable manner; and finally subjecting the residue of ore to concentration.

2. A process of treating sulfid ore consisting first in subjecting the raw or unroasted ore to the action of a cyanid solution whereby the finer metallic values are dissolved, and second, subjecting the ore or tailings to concentration whereby the coarser values are recovered.

In testimony whereof I affix my signature in presence of two witnesses.

ALDEN H. BROWN.

Witnesses:
 DENA NELSON,
 OTTO E. HODDICK.